(No Model.)
J. S. UPTON.
GRAIN SEPARATOR.
No. 318,835. Patented May 26, 1885.
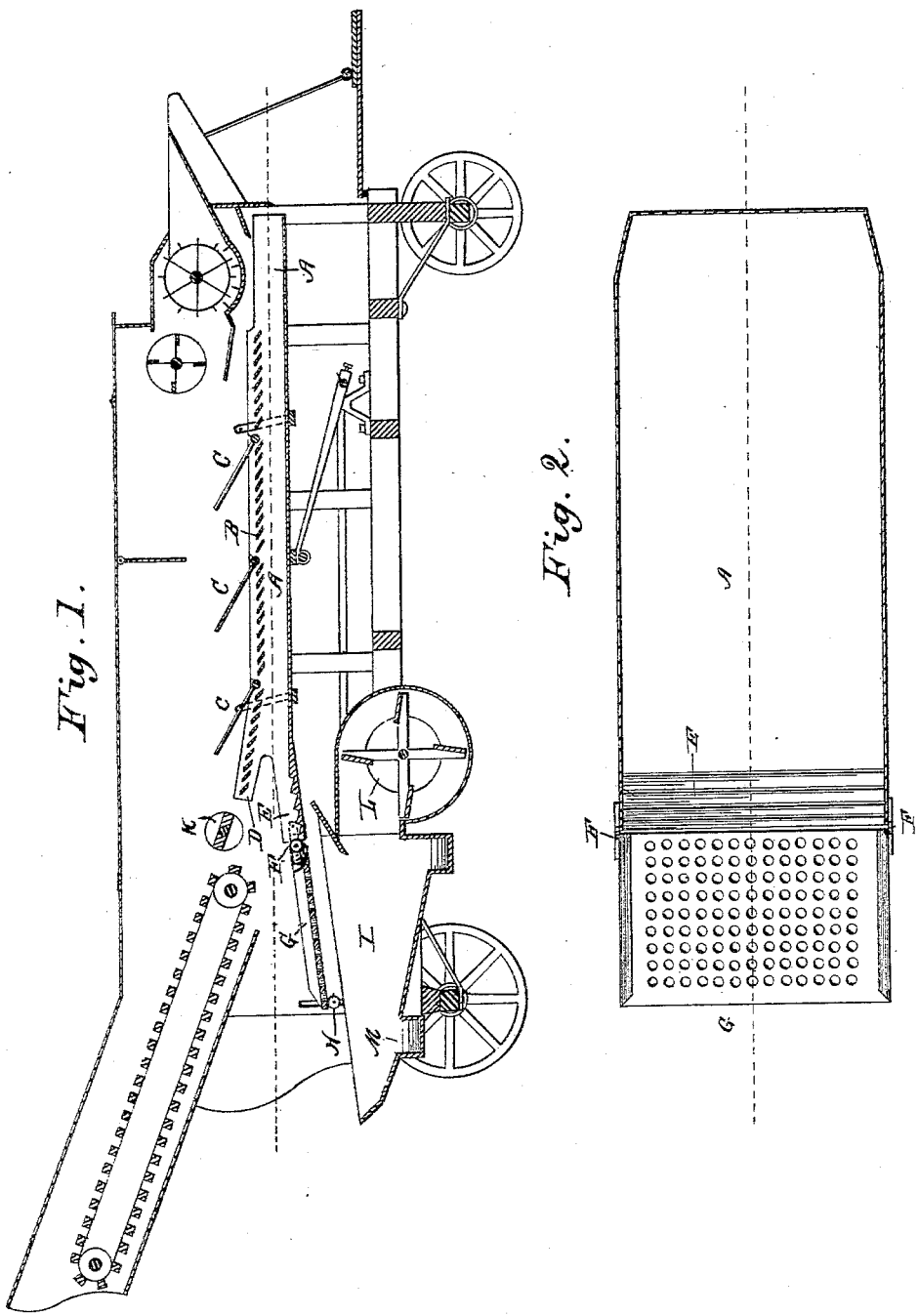
Witnesses:
B. J. Arnold
F. H. Peavey
Inventor.
James S. Upton
By C. M. Alexander
His Atty.

UNITED STATES PATENT OFFICE.

JAMES S. UPTON, OF BATTLE CREEK, MICHIGAN.

GRAIN-SEPARATOR.

SPECIFICATION forming part of Letters Patent No. 318,835, dated May 26, 1885.

Application filed January 24, 1885. (No model.)

*To all whom it may concern:*

Be it known that I, JAMES S. UPTON, a citizen of the United States, residing at Battle Creek, in the county of Calhoun and State of Michigan, have invented certain new and useful Improvements in Grain-Separators, of which the following is a specification, reference being had therein to the accompanying drawings.

My invention relates to improvements in grain-separators, and is designed to produce a perfect and thorough cleaning of the grain from straw and chaff.

The improvement consists, essentially, in the construction of the shaker and its parts, as hereinafter described, and pointed out in the claims.

In the following description reference is had to the annexed drawings, showing in Figure 1 a longitudinal section through a grain-separator and in Fig. 2 a sectioned plan view of the shaker.

Reference to the parts common to this class of machines will be omitted, except where bearing directly on the improvement or on its operation. A shaker, A, is formed with a solid bottom and slatted top, B. It carries a series of fingers, C, and terminates over the shoe in a V-extension. The upper and shorter arm, D, of this extension carries a continuation of the slats B, and the lower arm, E, is notched and at an angle downward to the plane of the bottom of the shaker.

By means of a flexible fastening, F, consisting of a hinge, swivel, or spring, a perforated board, G, is secured at one end to the arm E coincident with it, the outer end of said board being supported, preferably, on adjustable rollers H. The board G rests over the shoe I. The shaker is supported by suitable hangers, and receives an oscillatory movement by proper connections. A mass of straw, chaff, and grain is received on the forward end of the shaker, and is caused by its motion to travel to the rear. The fingers separate the straw thoroughly, and thus allow the escape of any grain that may be confined in it, and finally deliver it to a picker, K, which in turn delivers it to a carrier, which ejects it from the tail of the machine. The arm D serves the purpose of elevating the said straw sufficiently to be properly caught by said picker. The constant motion of the shaker carries a mass of grain and chaff to the rear, the notched arm E accelerating the delivery thereof to the perforated board. The portion of this board connected to the shaker has an oscillatory motion corresponding to that of said shaker, while the end resting on the rollers has only a sliding movement. This will give the mass on the board what may be termed a "jumping" motion, allowing the blast from the blower L, located in front of the shoe, to carry off all dust and light chaff that may reach this point. Whatever chaff is carried with the grain as it passes to the shoe will be blown out of the machine by the blast. The tailings fall into the heel or box M, and through a conveyer pass to the thrashing-cylinder. The free end of the board may be lowered, so that the blast passes directly through the perforations and the passage of the grain accelerated, or may be raised above the line of blast for seeds of light weight.

What I claim is—

1. In a grain-separator, a shaker having a solid bottom and slatted top, and at the rear a V-shaped continuation, the upper arm thereof carrying slats and the lower arm a notched continuation of the bottom, both arms being at an angle to the plane of the bottom proper, substantially as and for the purpose specified.

2. In a grain-separator, in combination with a shaker, a continuation thereof consisting of a perforated board flexibly connected to said shaker, and adjustable supporting-rollers for its free end, substantially as and for the purpose specified.

3. In a grain-separator, in combination with a shaker having a solid bottom and slatted top, which at the rear diverge, the bottom being notched, a perforated continuation of the bottom flexibly connected thereto, and adjustable supports at the free end of said continuation, substantially as and for the purpose specified.

In testimony whereof I affix my signature in presence of two witnesses.

JAMES S. UPTON.

Witnesses:
F. A. ALLWARDT,
FRANK H. LATTA.